Jan. 28, 1958 C. E. GERMANTON ET AL 2,821,597

REGISTER RELAY

Filed March 18, 1955 2 Sheets-Sheet 1

INVENTORS
C. E. GERMANTON
J. W. OLIVER
BY A. F. Kane
ATTORNEY

REGISTER RELAY

Filed March 18, 1955 2 Sheets-Sheet 2

INVENTORS
C. E. GERMANTON
J. W. OLIVER
BY A. F. Kane
ATTORNEY

United States Patent Office 2,821,597

Patented Jan. 28, 1958

2,821,597

REGISTER RELAY

Charles E. Germanton, Summit, and John W. Oliver, Metuchen, N. J., assignors to Bell Telephone Laboratories, Incorporated, New York, N. Y., a corporation of New York Application March 18, 1955, Serial No. 495,144

10 Claims. (Cl. 200—93)

This invention relates to devices for storing electrically characterized items of information and particularly to an electromagnetically controlled memory device.

Memory devices, in general, are well known and find numerous and diverse applications in the electrical arts. Frequently, and particularly in the telephone switching art, devices of this character are used to translate and store signals which are characterized in accordance with some predetermined code. Such devices, for example, find use as a telephone designation register which functions to store line designation digits, each of which is distinctively characterized in accordance with the well known two-out-of-five code. Of necessity, devices of this type after having been operated, must be maintained in their operated conditions for some more or less definite time interval, usually until the apparatus with which the register functions is prepared to receive the information stored in the register. This holding operation entails the use of holding circuits and the consequent consumption of power in the form of holding current which traverses the holding circuits during the remembering function of the register. This condition and other related conditions render such devices not completely satisfactory for the purpose for which they are intended. Specifically, such devices impose excessive current drain on the power source, for example the batteries of the telephone plant; are susceptible to conditions producing contact chatter; and are subject to loss of memory upon power failure.

It is one object of this invention to simplify and otherwise improve memory devices and particularly to provide a device of this nature which is capable of storing electrically characterized items of information indefinitely, without the consumption of power in the remembering process; which combines sensitivity of operation with a minimum of disturbance caused by contact chatter; the remembering function of which is immune to or otherwise unaffected by power failure; and which readily lends itself to a package-type construction which permits a plurality of switch units to be combined in a unitary structure and to respond cooperatively when subjected to electrical impulses transmitted in code, as for example, the well known two-out-of-five code.

This object is attained in accordance with a feature of the invention by combining, in a single unitary package, a plurality of polarized electromagnetic switch units each having a contact controlling armature which is held magnetically, and particularly by magnetic flux produced solely by the polarizing means, in either of two operated positions during the remembering process.

Another feature of the invention contemplates the mounting of the armatures of the several switch units, in spaced parallel arrangement, upon a common support of magnetic material which functions also as a magnetic interchanger or return path for the magnetic flux set up by the switch units.

A further feature of the invention resides in combining the polarizing means of the switch units exclusively to the vicinity associated with the operating ends of the switch armatures, thereby obtaining a relatively short path for the biasing flux and a concentration of such flux at the operating ends of the contact controlling armatures.

Still another feature of the invention resides in the use of sealed switch units of either the dry-reed type or of the mercury-wetted contact type.

A still further feature of the invention resides in locating the several switch units in tandem array, either straight line or circular, and positioning an individual bar-type permanent magnet between members of adjacent switch units in such a manner that the polarization of any one unit is produced by unlike poles of two different permanent magnets.

Another feature of the invention resides in the use of an insulating enclosure for a plurality of circularly arrayed switch units which is provided with a plurality of equi-spaced recessed areas, each of which houses or accommodates a bar-type permanent magnet and holds it in engagement with a different contact element of each of two adjacent switch units.

Still a further feature of the invention contemplates a structure which adapts itself to circuitry, involving the energizing coils of the several switch units, such that the energization of a particular group of coils in one direction results in the energizing current traversing the remaining coils in the reverse direction, whereby the armatures of the first group engage those contact elements under the immediate influence of the positive poles of the associated permanent magnets and the armatures of the remaining coils engage those contact elements under the immediate influence of the negative poles of the associated permanent magnets. Particularly, the structural design is such that, under conditions of coil energizations such as described, the operated armatures of one group are serially connected to the armatures of the other group by way of the magnetic interchanger to effect flux conducting paths between the positive poles of one group of permanent magnets and the negative poles of the remaining magnets.

These and other features of the invention will be better understood from the following detailed description when read with reference to the accompanying drawings in which.

Figure 1:
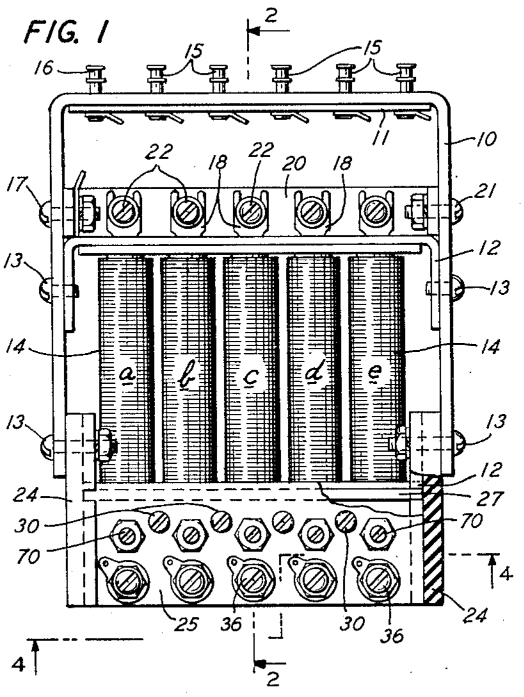
Fig. 1 is a side elevation of one form of memory device embodying features of the invention.
Figure 2:
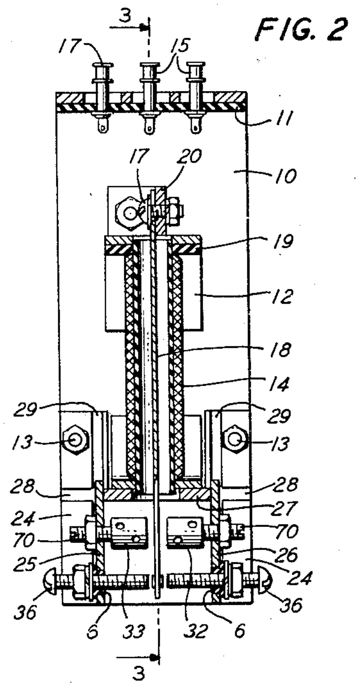
Fig. 2 is a section taken along the line 2—2 of Fig. 1 looking in the direction of the arrows.

The following description is directed to the embodiment shown in Figs. 1, 2, 3 and 4.

All of the components of the memory device or register of Figs. 1, 2, 3 and 4 are mounted on a U-shaped sheet 10 of aluminum or other suitable material. Secured to the two vertical legs of the member 10 by means of screw bolts 13 are two aluminum members 12 which, in effect, constitute upper and lower spoolheads for the five coils 14. These coils are designated in Fig. 1 also by the small letters *a, b, c, d* and *e* for a purpose which will appear hereinafter. Each coil is wound on a sleeve 9 of insulating material in well known manner and each sleeve, at its upper end, passes through a suitable aperture in the insulating member 19 and partially through a smaller aperture in the upper spoolhead member 12. The apertures in the spoolhead 12 obviously, are in alignment with those in the insulating piece 19. The lower aluminum spoolhead 12 is provided with similar apertures which accommodate the lower ends of the insulating sleeves 9. In assembling the components thus far identified, the upper spoolhead member 12 may be fixed in position by means of the screws 13; the insulating piece 19 positioned with its apertures in alignment with those in the spoolhead 12; and the coil-bearing sleeves 9 inserted into such apertures. The lower spoolhead member 12 may then be manipulated so that the lower ends of the coil-bearing sleeves 9 fit into and project through the apertures therein. By forcing the lower spoolhead 12 inwardly and thence securing it to the legs of the mounting member 10 by means of the screw bolts 13, the coil assemblies are firmly clamped in position and are arranged in spaced parallel alignment.

Immediately above the upper spoolhead 12 and parallel therewith is a crossbar 20 of magnetic iron. This bar, which functions as an interchanger as well as a support for the armatures 18, is secured to the mounting member 10 by means of screw bolts 21 and is positioned thereon before the coil assemblies. The armatures 18 are fixed in parallel spaced relation on the interchanger 20 by means of screws 22. The end of each armature is bifurcated to simplify the mounting and removal of the armatures. The armatures 18 may be assembled on the interchanger 20 either before or after the coil assembly has been fixed in position. In either case the coil and its corresponding armature are arranged in telescopic relation, the armature being of sufficient length to project from the lower end of the coil.

An insulating plug 24 is fixed to each vertical leg of the mounting member 10 near its extremity by means of screws 13. One such plug is shown in section on the right of Fig. 4 and partly in section on the right of Fig. 1. These two plugs constitute a mounting for the polarizing magnet 27 and its associated polar extensions 25 and 26. The permanent magnet 27 is substantially rectangular in form and is provided with five circular apertures 8 which align themselves with similar apertures in the lower spoolhead 12. Each plug 24 is provided with a horizontal slot 28 which, with its opposed slot, serves to accommodate and provide a seat for the permanent magnet 27, it being apparent that the magnet may be slid into position on the slots. Each plug 24 is provided also with two vertical slots 29 which permit the two polar extensions 25 and 26 to be slid into position, in which position they abut the front and rear edges of the permanent magnet, as clearly shown in Fig. 2. When thus slid into position they are held together in tight engagement with the permanent magnet by means of four machine screws 30.

Each polar extension mounts five pole pieces, the extension 25 (Figs. 2 and 3) mounting the pole pieces 33 and the extension 26 mounting the pole piece 32. The pole pieces 32 and 33 may take the form of internally threaded sleeves which screw on to suitable screws 70 and are provided with suitable peripheral holes which accommodate adjusting pins. Thus the pole pieces are readily adjustable with respect to the armatures 18.

Each polar extension also supports five adjustable screw-type contacts 36, each of which is mounted below and in substantial alignment with a corresponding pole piece. Each contact 36 is insulated from its corresponding polar extension 25, 26 by means of an insulating bushing 6.

Each armature 18 carries a contact of any suitable material on either side thereof near its operating end. These contacts are moved into engagement with either of the stationary contacts 36 when the associated coil 14 is energized and depending upon the direction of the energizing current through the coil.

Suitable terminals 15, 16 and 7 are mounted on an insulating strip 11 which is secured to the undersurface of the crossbar of the U-shaped mounting member 10. These terminals, like the contact terminals 36, are provided with suitable tabs to which wiring connections may be made. The single terminal 16 is provided to permit connection to be made with the ground terminal associated with the screw bolt 17. There are two rows of terminals 15, five terminals in each row, which make connections with the five coils 14. One row of five terminals 7 is provided for connecting to the five armatures 18. These terminals are generally referred to as "read out" terminals.

Figures 3, 4:
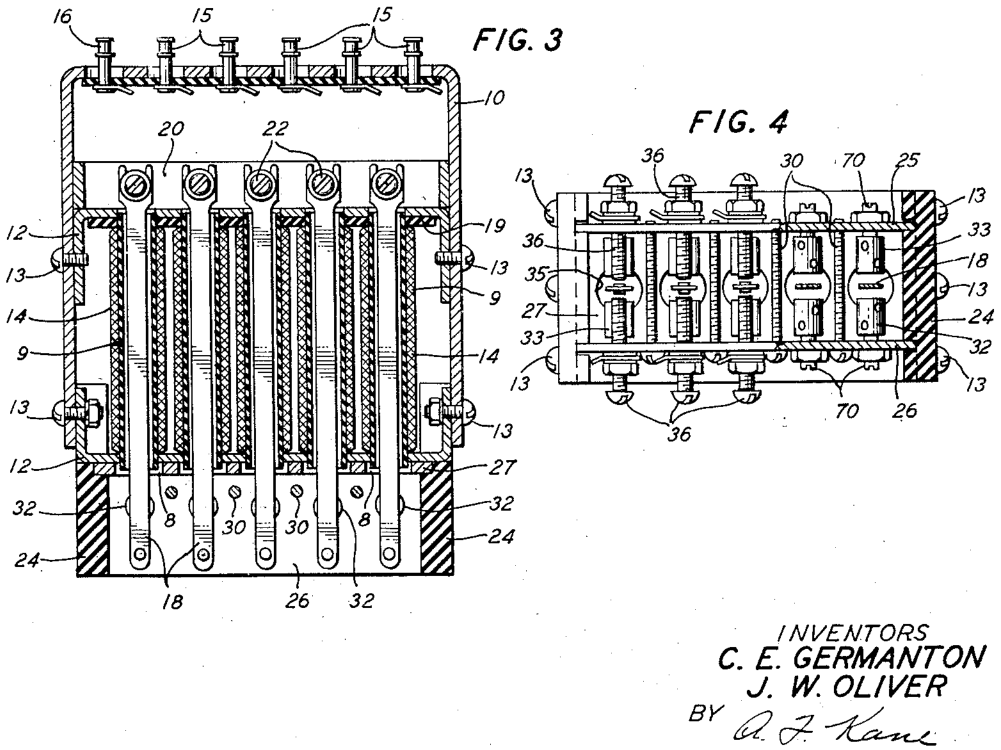
Fig. 3 is a section taken along the line 3—3 of Fig. 2 looking in the direction of the arrows.
Fig. 4 is a front end view of the memory device shown in Figs. 1, 2 and 3.

The permanent magnet 27 is so magnetized that the upper area thereof, viewing Fig. 4, is of one polarity and the lower area is of the opposite polarity, with a neutral axis located midway to the two areas. Obviously, therefore, the inner faces of pole pieces 32 present one polarity to the outer ends of corresponding armatures 18 while the inner faces of pole pieces 33 present a different polarity to the outer ends of corresponding armatures. The direction in which any armature operates with respect to its associated contacts 36, therefore, depends upon the direction of the current which traverses the corresponding coil 14. When so operated, the armatures remain in engagement with the engaged contact 36 under the sole influence of the polarizing flux produced by the permanent magnet 27 and remain in their operated positions after the cessation of flow of current through the coils 14.

Figure 10:
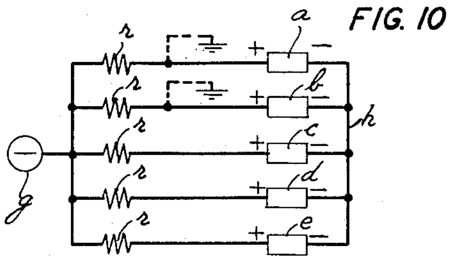
Fig. 10 is a simplified schematic diagram showing the circuitry involved in a particular application of the memory device of this invention.

The memory device of this invention when functioning as an impulse register in a telephone switching system is described in detail in a concurrently filed application of C. E. Germanton, Serial No. 495,088. A brief description of such use of the memory device of this invention will be included in this application and for this purpose reference is made to Fig. 10, together with Figs. 1 to 4, inclusive.

In its use as an impulse register, the memory device of this invention responds to pulses transmitted in accordance with the well known two-out-of-five code. It will be noted that each of the left terminals of the polarized switching devices *a, b, c, d* and *e*, which correspond respectively to the five switches of the memory device of Figs. 1, 2, 3 and 4, is connected to a source of potential *g* by way of a resistance *r* and the right terminals of all devices *a, b, c, d* and *e* are electrically interconnected. The interconnecting lead *h* is referred to as an electric interchanger and corresponds to the magnetic iron interchanger 20 of Figs. 1, 2, 3 and 4. When a series of pulses is transmitted and results in the grounding of a pair of leads such as those extending to the switching devices *a* and *b* (as described in detail in the above-identified Germanton application) current from source *g* traverses a path which includes the lower three resistances *r*, the winding of switching devices *c, d* and *e* in one direction (erase) and through the electric interchanger *h* to ground through the windings of switching devices *a* and *b* in the reverse (write) direction. Thus the switching components *a* and *b* are operated in one direction and the switching components *c, d* and *e* are operated in the opposite direction.

Referring particularly to Figs. 1, 2, 3 and 4, when the coils *a* and *b* are energized in a direction such as to cause the two left armatures of Fig. 4 to move towards the corresponding lower pole pieces 33, the remaining three armatures are moved towards their corresponding upper pole pieces 32 so that a flux path may be traced from the two lower pole pieces 33 of one polarity over the corresponding two armatures 14 of coils *a* and *b*, through the magnetic iron interchanger 20, back through the three remaining armatures 14 of coils *c*, *d* and *e*, to the corresponding upper pole pieces 32 of the opposite polarity. It will be observed that all five armatures remain in their operated positions, being held in such positions solely by the polarizing flux. Thus, no holding current is required during the remembering process of the memory device of this invention and the operated positions of the several switching components will be maintained even in the event of a power failure.

Figure 5:
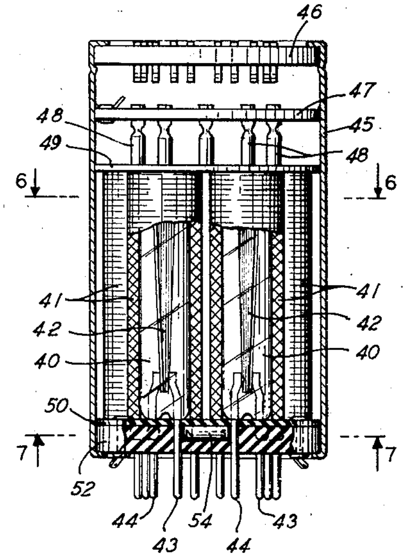
Fig. 5 is an elevation, partly in section, of a preferred form of memory device embodying features of the invention.
Figure 6:
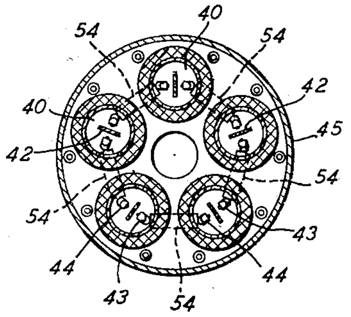
Fig. 6 is a section taken along the line 6—6 of Fig. 5 looking in the direction of the arrows.
Figure 7:
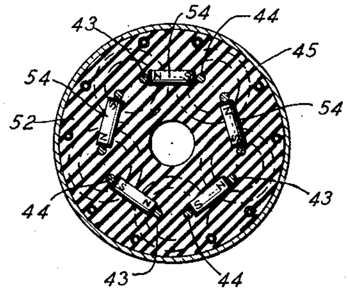
Fig. 7 is a section taken along the line 7—7 of Fig. 5 looking in the direction of the arrows.

In the preferred embodiment of the invention disclosed in Figs. 5, 6 and 7, the five switch units are disposed in a circular array, that is, they are radially disposed with respect to a common center point. Each switch unit furthermore, is a dry reed type of switch comprising a glass envelope or tube 40 with its encompassing winding 41, its reed-type armature 42 and contact elements 43 and 44. The contacts carried by the armatures of the individual switch units are of any suitable material. The general switch structure, of itself, presents no novelty.

The components of this form of memory device are housed in and supported by a hollow cylindrical casing 45 of aluminum or other suitable material. At the upper end of the cylinder 45 is fixed a circular disc 46 of insulating material which carries the necessary wiring terminals such as the common battery and armature ground terminals, and also the front and back terminals of the switch components. The necessary wiring to these terminal elements has been omitted from the drawings for purposes of clarity of disclosure. The disc 46 may be held in position in any suitable manner.

Below the disc 45 and in parallel alignment therewith is a circular disc 47 of magnetic iron which constitutes a mounting for the armatures 42 of the individual switch units and corresponds to the magnetic iron interchanger 20 of the embodiment shown in Figs. 1 to 4, inclusive. Armatures 42, or more specifically their extensions 48 may be held in position on the interchanger 47 in any suitable manner. For example, the interchanger may be provided with suitable apertures which accommodate the armature extensions 48 which are then fastened in position by prick punching the magnetic iron at the edges of the apertures. The five switch units illustrated may be provided with a common insulating spoolhead 49 which abuts the upper ends of the five coils, or, if desirable, each coil may be provided with its own individual spoolhead. In either case it is essential that a central aperture or spacing be provided to permit the passage of the necessary wiring from the coils and contact members through a smaller centrally located aperture in the interchanger 47 to the terminal posts carried by the insulation disc 46.

The lower ends of the coils 41 are provided with a common insulating spoolhead 50 which is circular in configuration and is provided with a central aperture through which the wiring is brought up between the switch units and through corresponding apertures in the elements 49 and 47.

A relatively thick disc 52 of insulating material, such as plexiglass, is provided with ten suitably disposed apertures or holes through each of which one of the contact terminals 43 or 44 extends. These terminals may be generally pin-like in configuration. The disc 52 is also provided with five small recessed areas into each of which is snugly fitted a small bar-type permanent magnet 54. The five recessed areas communicate with adjacent contact-housing apertures and are so located that each magnet is in communication with a pair of contact elements 43 and 44. That is, one end of a magnet is in engagement with a contact 43 of one switch unit and the other end of the same magnet is in engagement with the contact 44 of an adjacent switch unit. The depth of the recessed areas in disc 52 in which the permanent magnets 54 are housed is such that, when the disc is set in position within the container 45, the upper surfaces of the magnets abut the insulating spoolhead 50, thus securely holding the magnets in position. The extremities of the permanent magnet are treated with an enamel or other suitable insulating material in order to prevent the magnets from acting as an electrical short circuit between the associated pairs of contact terminals 43 and 44.

The five permanent magnets 54 constitute a series magnetic path, the physical continuity of which is interrupted at the air gaps effected by the armatures 42 and their corresponding contact terminals 43 and 44. Thus, when any two coils 41 of the memory device are energized in one direction and the remaining three coils, of necessity, are energized in the reverse direction, as described previously in connection with the embodiment shown in Figs. 1 to 4, inclusive, two of the armatures 42 will move into engagement with their associated contact terminals 43, which are under the magnetic influence of like poles of the magnets abutting the contacts 43, while the remaining three armatures will move into engagement with their associated contact terminals 44, which are under the magnetic influence of the negative poles of the magnets contacting switch contact terminals 44. The flux path under such condition extends from the north poles of the magnets in contact with the two terminals 43 now engaged by their corresponding armatures, through switch armatures 42, through the corresponding armature extensions 48 and the magnetic iron interchanger 47, back through the remaining armatures 42, by way of their corresponding extensions 48 and the contact terminals 44 now engaged by such three armatures, and then to the negative poles of the magnets associated with such switch terminals. The armatures thus operated are held in their respective operated positions under the sole influence of the polarizing flux of the permanent magnets. The maintenance of such positions is independent of current and such positions are persisted in after the original energizing current has been discontinued and without the need for holding circuits or holding current.

Figure 8:
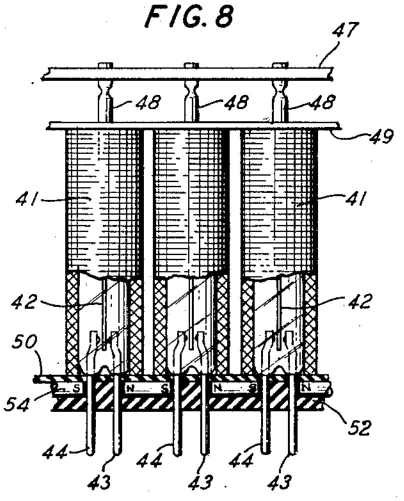
Fig. 8 is a fragmentary elevation, partly in section, of a further modification of the invention and illustrates the memory device of Fig. 5 in rectangular, rather than circular form.

It is not deemed necessary to direct any detailed description of the modification of the memory device shown in Fig. 8 in which the same numerals are used as are used in Figs. 5, 6 and 7 to identify like elements. It is apparent that the description of the embodiment shown in Figs. 5, 6 and 7 applies equally well to the form of the invention shown in Fig. 8. Suffice it to say that the individual switch units in the latter embodiments are arranged in straight line tandem as compared to the circular grouping of the switch units of Figs. 5, 6 and 7. Obviously, such components as the interchanger 47, the spoolhead 49 and 50 and the insulating pieces 52 would be rectangular in configuration rather than circular.

Figure 9:
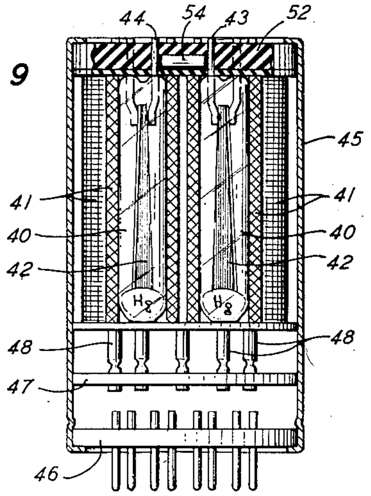
Fig. 9 is an elevation, partly in section, of a memory device involving features of the invention and which employs switch units of the mercury-wetted contact type.

The modification shown in Fig. 9 is a substantial duplicate of the memory device shown in Fig. 5 in inverted form. In this embodiment, a pool of mercury is located at the base of each envelope 40. From this source the switch contacts are mercury-wetted in well known manner. Also the switch terminals 43 are shorter in length than the corresponding terminals of the device of Fig. 5 while the terminal posts carried by the insulating disc 46 are longer than their counterparts of Fig. 5. The same numerals are used in Figs. 5 and 9 to identify similar parts and the description made with reference to Fig. 5 applies equally well to Fig. 9 so that no further description of the latter is required.

What is claimed is:

1. In a multiunit switching device, a plurality of adjacently disposed switching units, each including a pair of armature-engageable contact terminals, and polarizing means for said switching device comprising a permanent magnet interposed between adjacent switching units, each permanent magnet having one pole in engagement with a particular contact terminal of one of said switching units and the other pole in engagement with a different contact terminal of an adjacent switching unit.

2. A multiunit switching device comprising a plurality of switching units arranged concentrically about a common axis and each including an armature, an energizing coil, and contact terminals engageable by said armature upon energization of said coil, and polarizing means for said device comprising a bar-type permanent magnet interposed between adjacent switching units with one pole thereof in engagement with a contact terminal of one of said switching units and the other pole thereof in engagement with a contact terminal of a different one of said switching units.

3. In a multiunit switching device, adjacently disposed switch units of similar design, each having a pair of spaced contact terminals, an armature engageably located with respect to said terminals, and an energizing coil for controlling the engagement of said terminals by said armature, a permanent magnet interposed between different contact terminals of adjacent switch units, and a common support of magnetic material to which one end of each of the armatures of all said switch units is secured.

4. In a switching device, a plurality of switch units each including an envelope having fixed contact members therein and projecting therefrom, means mounting said units in circular tandem array whereby the projecting portions of said contact members are similarly arranged in circular tandem array, polarizing means comprising a plurality of bar-type permanent magnets and means mounting one of said permanent magnets between each of the projecting contact portions of adjacent switch units.

5. In a switching device, a hollow cylindrical housing, a plurality of mercury-contact switches contained in said housing each comprising a tube, an armature located in said tube and extending from one end thereof, contact members engageable within said tube by said armature and projecting from the other end of the tube, and an energizing coil exteriorly disposed with respect to said tube, an insulating enclosure for one end of said housing having apertures thereon through which the projecting ends of said contact members protrude and provided with a plurality of recessed areas circularly arranged thereon, and a permanent magnet housed in each of the recessed areas of said insulating enclosure, said recessed areas communicating with the apertures in said insulating enclosure whereby the said permanent magnets are in contact with the projecting ends of said contact members.

6. In combination, a plurality of switch units each comprising a sealed tube, an armature housed therein, a front contact member located on one side of said armature and projecting from said tube, a back contact member located in the other side of said armature and projecting from said tube, and an energizing coil encompassing said tube, means mounting all said switch units in a unitary structure, and polarizing means for each of said switch units comprising a bar-type permanent magnet positioned between the projecting portion of the front contact member of one of the switch units and the projecting portion of the back contact member of a different one of the switch units.

7. The combination in accordance with the preceding claim 6 in which one end of each of the armatures of said switch units projects from the corresponding tube and is secured to a common support of magnetic material.

8. In combination, a register comprising a plurality of switch units each including an energizing coil and an armature responsive to the energization of said coil, a common magnetic circuit for said switch units comprising a bar of magnetic material and a permanent magnet, means securing each armature to said bar of magnetic material for movement relative thereto incident to the energization of the corresponding coil, and means including said permanent magnet for mounting said coils in telescopic relation to the corresponding armatures.

9. The combination according to claim 8 in which said permanent magnet is provided with a pair of pole pieces for each of said armatures, and means are provided for mounting one of each of said pairs of pole pieces on one side of the corresponding armature near the operating end thereof and for mounting the other of each of said pairs of pole pieces on the other side of the corresponding armature near the operating end thereof.

10. In a multiunit switching device, a plurality of switch units each including an armature having a fixed end and a movable contact controlling end, contact terminals located near the movable end of said armature, and a coil for controlling the movement of said armature, polarizing means for each switch unit comprising permanent magnet means located entirely in the vicinity of the movable end of said armature thereby to effect a relatively short polarizing flux path at the contact controlling end of the armature, a common support of magnetic material for said armatures, and means for securing the fixed ends of the armatures of all said switch units to said common support.

References Cited in the file of this patent

UNITED STATES PATENTS

| | | |
|---|---|---|
| 701,499 | Norstrom | June 3, 1902 |
| 762,338 | McBerty | June 14, 1904 |
| 827,964 | Dean | Aug. 7, 1906 |
| 1,953,929 | Droysen | Apr. 10, 1934 |
| 2,187,115 | Ellwood et al. | Jan. 16, 1940 |
| 2,387,017 | Harrison | Oct. 16, 1945 |
| 2,397,123 | Brown | Mar. 26, 1946 |
| 2,489,372 | Garstang | Nov. 29, 1949 |
| 2,609,464 | Brown et al. | Sept. 2, 1952 |

FOREIGN PATENTS

| | | |
|---|---|---|
| 71,322 | Austria | Mar. 10, 1916 |